United States Patent
Rajashekara et al.

(10) Patent No.: US 11,323,038 B2
(45) Date of Patent: May 3, 2022

(54) SINGLE PHASE SINGLE STAGE BI-DIRECTIONAL LEVEL 1 ELECTRIC VEHICLE BATTERY CHARGER

(71) Applicant: University of Houston System, Houston, TX (US)

(72) Inventors: Kaushik Rajashekara, Pearland, TX (US); Parthasarathy Nayak, Houston, TX (US); Sumit Kumar Pramanick, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 214 days.

(21) Appl. No.: 16/638,620

(22) PCT Filed: Aug. 2, 2018

(86) PCT No.: PCT/US2018/044930
§ 371 (c)(1),
(2) Date: Feb. 12, 2020

(87) PCT Pub. No.: WO2019/036201
PCT Pub. Date: Feb. 21, 2019

(65) Prior Publication Data
US 2021/0135581 A1 May 6, 2021

Related U.S. Application Data

(60) Provisional application No. 62/546,955, filed on Aug. 17, 2017.

(51) Int. Cl.
*H02M 3/335* (2006.01)
*B60L 53/60* (2019.01)
(Continued)

(52) U.S. Cl.
CPC ......... *H02M 3/33576* (2013.01); *B60L 53/60* (2019.02); *B60L 55/00* (2019.02);
(Continued)

(58) Field of Classification Search
CPC .......... H02M 3/33576; H02M 1/4241; H02M 1/0058; H02M 1/0087; H02M 5/297;
(Continued)

(56) References Cited

U.S. PATENT DOCUMENTS 6,343,021 B1  1/2002  Williamson
6,952,355 B2  10/2005  Riggio et al.
(Continued)

FOREIGN PATENT DOCUMENTS

WO   2016/024223   2/2016

OTHER PUBLICATIONS

"Bidirectional AC-DC Converter for Vehicle-to Grid (V2G) Applications", Arjun Raj Prabu Andhra Sridhar, Marquette e-Publication, @2015.*

(Continued)

*Primary Examiner* — Nha T Nguyen
(74) *Attorney, Agent, or Firm* — Jackson Walker LLP

(57) ABSTRACT

A single phase single stage level-1 electric vehicle (EV) battery charger can control the power flow in both directions. The converter efficiency is high as the devices undergo ZCS which reduces switching loss in the devices. This converter does not require any intermediate DC link capacitor stage and the power density of the converter is high.

8 Claims, 9 Drawing Sheets

(51) Int. Cl.
| | |
|---|---|
| *B60L 55/00* | (2019.01) |
| *H02M 1/42* | (2007.01) |
| *H02M 1/00* | (2006.01) |

(52) U.S. Cl.
CPC ....... *H02M 1/4241* (2013.01); *B60L 2210/10* (2013.01); *H02M 1/0058* (2021.05)

(58) Field of Classification Search
CPC ...... H02M 1/4258; H02M 7/48; H02M 7/797; B60L 53/60; B60L 55/00; B60L 2210/10; Y02B 70/10; Y02T 10/70; Y02T 10/7072; Y02T 10/92; Y02T 90/12

See application file for complete search history.

(56) References Cited

U.S. PATENT DOCUMENTS

| | | | | |
|---|---|---|---|---|
| 8,559,193 | B2* | 10/2013 | Mazumder | H02M 7/4807 |
| | | | | 363/8 |
| 8,693,213 | B2 | 4/2014 | Jungreis et al. | |
| 9,379,640 | B2 | 6/2016 | Mazumder | |
| 10,250,053 | B2* | 4/2019 | Xue | H02J 7/00 |
| 2003/0095424 | A1 | 5/2003 | Oates | |
| 2009/0225569 | A1* | 9/2009 | Begalke | H02M 3/3378 |
| | | | | 363/17 |
| 2017/0064802 | A1 | 3/2017 | Tran et al. | |
| 2017/0229972 | A1* | 8/2017 | Cerqueira Pinto Bezerra Varajão | H02M 7/797 |

OTHER PUBLICATIONS

Jauch, et al., "Single-Phase Single-Stage Bidirectional Isolated ZVS AC-DC Converter with PFC", 15th International Power Electronics and Motion Control Conference, EPE-PEMC 2012 ECCE Europe, IEEE, 8 pages.

Athab, et al., "An Efficient Single-Switch Quasi-Active PFC Converter With Continuous Input Current and Low DC-Bus Voltage Stress", IEEE Transactions on Industrial Electronics, vol. 61, No. 4, Apr. 2014, pp. 1735-1749.

Li, et al. "Soft-Switching Single Stage Isolated AC-DC Converter for Single-Phase High Power PFC Applications", 9th International Conference on Power Electronics—ECCE Asia, Jun. 1-5, 2015, pp. 1103-1108.

Watson, et al., "A Soft-Switched, Full-Bridge Boost Converter Employing an Active-Clamp Circuit", 1996, IEEE, pp. 1948-1954.

Qiao, et al., "A Topology Survey of Single-Stage Power Factor Corrector with a Boost Type Input-Current-Shaper", IEEE Transactions on Power Electronics, vol. 16, No. 3, May 2001, pp. 360-368.

Pahlevaninezhad, et al., "A Self Sustained Oscillation Controlled Three Level AC-DC Single Stage Converter", IEEE, 2012, pp. 1172-1178.

Youssef, "Analysis and Design of a Compact Single-Stage AC-DC Resonant Converter with High Power Factor", 2007, IEEE, pp. 702-705.

Dusmez, "A Fully Integrated Three-Level Isolated Single-Stage PFC Converter", IEEE Transactions on Power Electronics, vol. 30, No. 4, Apr. 2015, pp. 2050-2062.

Guo, et al., "Operation Principles of Bidirectional Isolated AC/DC Converter with Natural Clamping Soft Switching Scheme", IEEE, 2014, pp. 4866-4872.

Ribeiro, et al., "Solving Technical Problems on the Full-Bridge Single-Stage PFCs", IEEE Transactions on Industrial Electronics, vol. 61, No. 5, May 2014, pp. 2264-2277.

Pinheiro, et al, "Self-Oscillating Resonant AC/DC Converter Topology for Input Power-Factor Correction", IEEE Transactions on Industrial Electronics, vol. 46, No. 4, Aug. 1999, pp. 692-702.

Jain, et al., "A Single-Stage Zero-Voltage Zero-Current-Switched Full-Bridge DC Power Supply with Extended Load Power Range", IEEE Transactions on Industrial Electronics, vol. 46, No. 2, Apr. 1999, pp. 261-270.

Chen, et al., "Study and Implementation of a Single-Stage Current-Fed Boost PFC Converter With ZCS for High Voltage Applications", IEEE Transactions on Power Electronics, vol. 23, No. 1, Jan. 2008, pp. 379-386.

Singh, et al., "A Review of Single-Phase Improved Power Quality AC-DC Converters", IEEE Transactions on Idustrial Electronics, vol. 50, No. 5, Oct. 2003, pp. 962-981.

Gautam, et al., "An Automotive On-Board 3.3 kW Battery Charger for PHEV Application", IEEE, 2011, 6 pages.

Weise, et al., "DQ Current Control of a Bidirectional, Isolated Single-Stage AC-DC Converter", IEEE, 2014, pp. 1888-1893.

Xu, et al,. "Input-series and output-parallel connected single stage buck type modular ac-dc converters with high-frequency isolation", IET Power Electronics, 2015, vol. 8, Issue 7, pp. 1295-1304.

Zhu, et al., "A High-Frequency-Link Single-Phase PWM Rectifier", IEEE Transactions on Industrial Electronics, vol. 62, No. 1, Jan. 2015, pp. 289-298.

Agamy, et al. "A Three-Level Resonant Single-Stage Power Factor Correction Converter: Analysis, Design, and Implementation", IEEE Transactions on Industrial Electronics, vol. 56, No. 6, Jun. 2009, pp. 2095-2107.

Everts, et al,. "Optimal ZVS Modulation of Single-Phase Single-Stage Bidirectional DAB AC-DC Converters", IEEE Transactions on Power Electronics, vol. 29, No. 8, Aug. 2014, pp. 3954-3970.

Notification of Transmittal of the International Search Report and the Written Opinion dated Nov. 8, 2018 from the International Search Authority—The European Patent Office—for International Application No. PCT/US18/44930, 15 pages.

Li, et al., "Soft-Switching Single Stage Isolated AC-DC Converter for Single-Phase High Power PFC Applications", 9th International Conference on Power Electronics—ECCE Asia, Jun. 1-5, 2015, Seoul, Korea, 6 pages.

Pahlevaninexhad, et al., "A Self Sustained Oscillation Controlled Three Level AC-DC Single Stage Converter", Applied Power Electronics Conference and Exposition (APEC), 2012, 27th Annual IEEE, Feb. 5, 2012, pp. 1172-1178.

Notification of Transmittal of the International Preliminary Report on Patentability containing the Written Opinion from the International Search Authority—The European Patent Office—dated Feb. 27, 2020 from the International Bureau of WIPO for International Application No. PCT/US18/44930, 9 pages.

\* cited by examiner

SINGLE PHASE SINGLE STAGE BI-DIRECTIONAL LEVEL 1 ELECTRIC VEHICLE BATTERY CHARGER

This application claims priority to U.S. Provisional Patent Application No. 62/546,955, entitled "Single Phase Single Stage Bi-Directional Level 1 Electric Vehicle Battery Charger," filed Aug. 17, 2017, the entire contents of which are hereby incorporated by reference.

BACKGROUND

This disclosure pertains to an electric vehicle (EV) battery charging application.

The electrification of transportation has significantly increased in recent times to reduce fossil fuel consumption and greenhouse emissions. Electric vehicles (EVs) are gradually replacing the conventional internal combustion engine based vehicles. However, the increasing penetration of these EVs can have a considerable impact on the grid. Thus the chargers used for charging the batteries should have additional features like power factor correction (PFC) controllers and bidirectional power flow capabilities to minimize the impact of power quality on the grid.

Commercially available single-phase isolated AC-DC EV battery chargers can be classified into two-stage solution and single-stage solution. The two stage solution consists of a front-end PFC stage. It is followed by an isolated DC-DC stage. The frontend stage employs diode bridge rectifiers followed by a boost, buck, or buck-boost stages. Large storage elements like electrolytic capacitors are required to link these two stages. The main advantage of this two-stage solution is that the output voltage regulation and PFC control are decoupled. Thus, the PFC performance can always be ensured despite the change in input AC voltage and load power. This PFC operation enhances the power quality of the grid. Nevertheless, this two-stage solution suffers from low overall efficiency due to more number of devices. Moreover, the converter power density is limited because of the two separate stages and bulky DC link capacitors.

The alternative solution is to develop single stage AC-DC converters. The fly back converters are selected to achieve cost-effective designs because theoretically only one active switch is necessary. However, they are only suitable for lower power level because of the high-voltage and current stresses on the devices. For high-power rating single stage AC-DC converters, full bridge (FB) type topologies are preferred. In the resonant type FB and dual active bridge type FB AC-DC converters, the output voltage regulation is realized either by changing the switching frequency or by shifting the phase angle between the two bridges. These converters only use capacitors as the output filter. Thus, the voltage rating of the capacitors is lower. However, the main disadvantage of these converters is the nonlinear relation between the control parameters and the input current. Even if a complex control algorithm is applied, the grid current total harmonics distortion (THD) is large compared to conventional two-stage solution.

SUMMARY

The present disclosure relates generally to a battery charger for electric vehicles (EVs), and particularly to a single stage single phase power converter for EV charging application.

In preferred embodiments, the AC side of the proposed converter has a current-fed full bridge matrix converter that is connected to another full-bridge converter on a secondary side of a high-frequency (HF) transformer. The advantages of the proposed EV charger are its bidirectional power flow capabilities, inherent power factor correction (PFC) control, the fact that intermediate DC link capacitors are not required, soft switching capabilities in both primary and secondary side switches, improved grid current quality due to input line inductor, and the fact that the power density and efficiency of the converter is high.

DETAILED DESCRIPTION OF PREFERRED EMBODIMENTS

The present disclosure relates to a single phase, single stage level-1 electric vehicle (EV) charger. The single phase single stage level-1 EV battery charger can control the power flow in both directions. Preferred switching sequences of the devices are also described. The converter efficiency is high as the devices undergo ZCS which reduces switching loss in the devices. This converter does not require any intermediate DC link capacitor stage. As an advantage, the power density of the converter is high.

Figure 1:
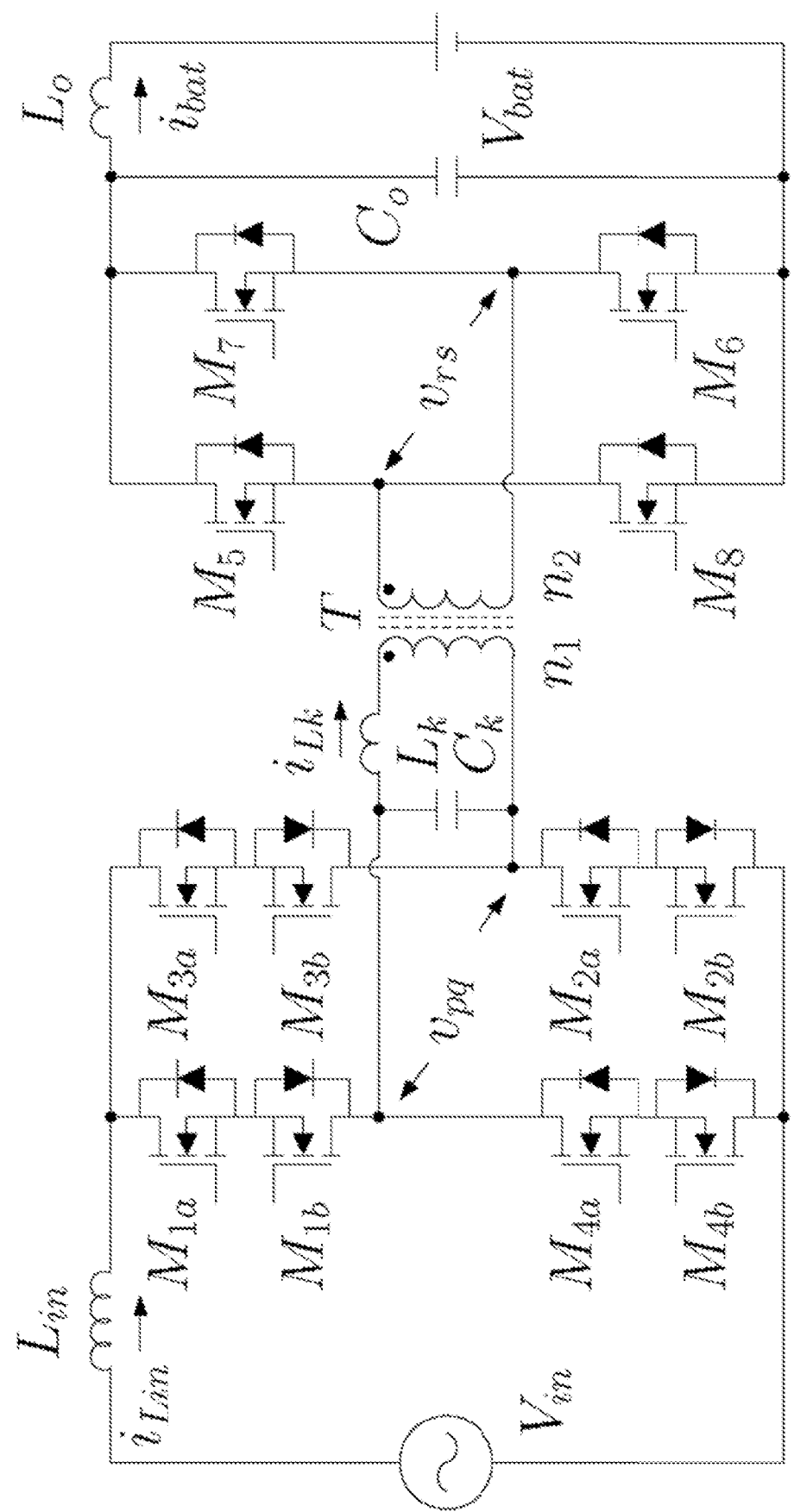
FIG. 1 shows converter topology for a preferred embodiment of a single phase, single stage level-1 bidirectional electric vehicle (EV) charger.

FIG. 1 shows converter topology for a preferred embodiment of a single phase, single stage level-1 bidirectional electric vehicle (EV) charger having inherent PFC control. The primary AC side includes 8 silicon carbide (SiC) metal-oxide-semiconductor field-effect transistors (MOSFETs) labeled $M_{1a}$ to $M_{4b}$ and the secondary side includes 4 SiC MOSFETs labeled $M_5$ to $M_8$. The converter develops a high frequency AC in the primary side of the isolating transformer, operating as a cycloconverter. It is then rectified in the secondary side to generate DC voltage. Similar operation is conducted in reverse direction for reverse power flow. Zero current switching (ZCS) is achieved with the help of a resonating circuit that includes leakage inductance ($L_k$) of the transformer and an external capacitor ($C_k$).

The converter topology shown in FIG. 1 is a preferred embodiment that can be extended to various applications. The proposed topology can be extended for grid integration of photovoltaic cells. It can operate independently in both grid connected mode and islanded mode. The proposed EV charger topology can also be extended for bidirectional power flow with a three phase operation.

Figure 2:
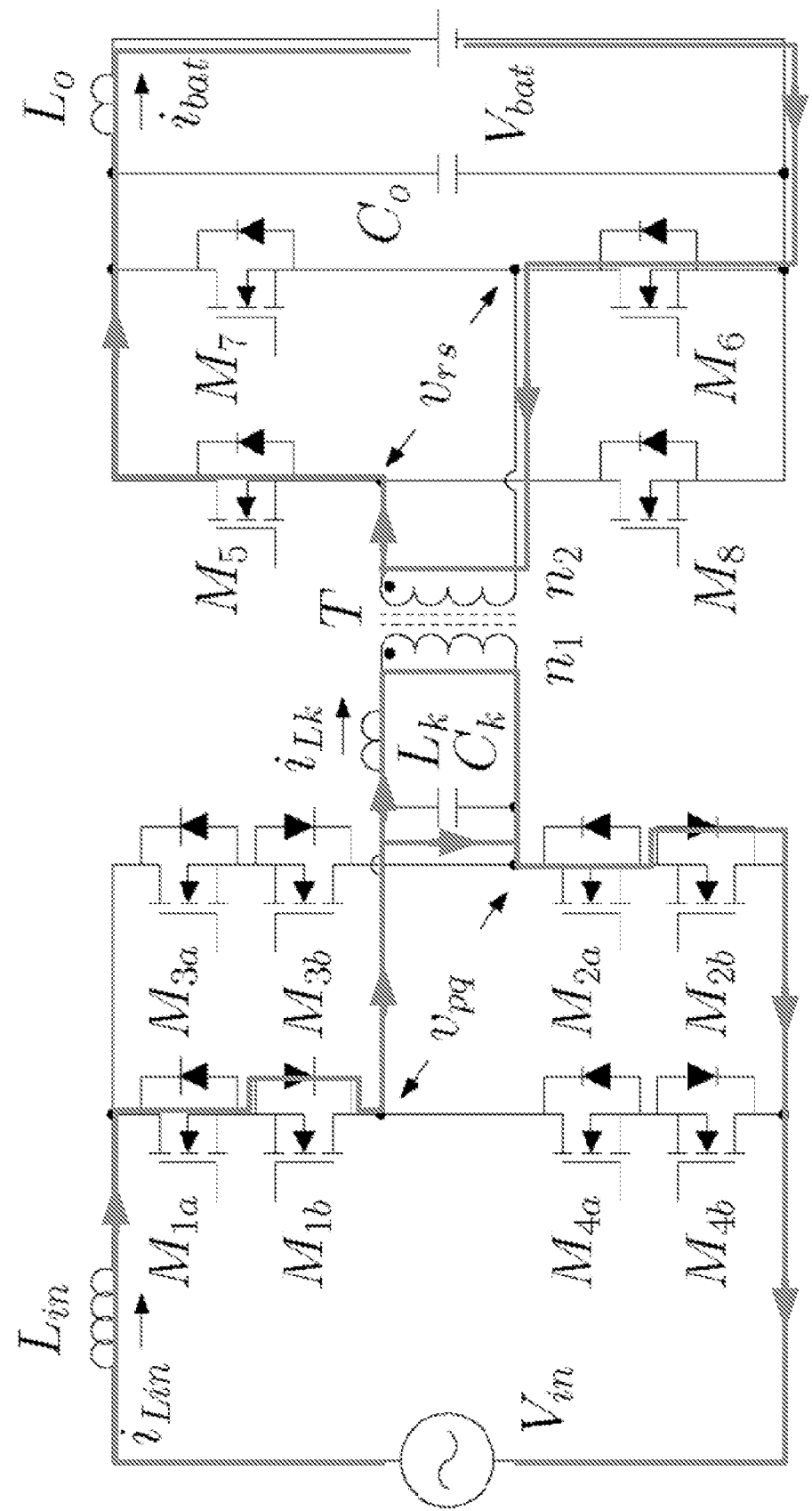
FIG. 2 shows a preferred embodiment of a converter in Mode 1 of operation during grid to vehicle (G2V) mode.

FIG. 2 shows a preferred embodiment of a converter during mode of operation that is grid to vehicle (G2V) mode. In this mode, which may be referred to as Mode 1, power is transferred from the input source (Vin) to the battery (Vbat). For G2V operation, active switching is conducted in the primary side and the secondary side devices are operated as a diode bridge rectifier. For positive input voltage (Vin>0), the operation can be divided from Mode 1 to Mode 4. Similarly, the operation can be divided from Mode 5 to Mode 8 for Vin<0. In this mode $M_{1a}$, $M_{2a}$ are kept on and $M_{1b}$ and $M_{2b}$ are kept off. As a result, the input current flows from the source ($V_{in}$) to leakage inductor ($L_k$) and capacitor ($C_k$) through $M_{1a}$, $M_{2a}$ and diodes of $M_{1b}$ and $M_{2b}$. In the secondary side, diodes of $M_5$ and $M_6$ conduct to charge the battery ($V_{bat}$).

Figure 3:
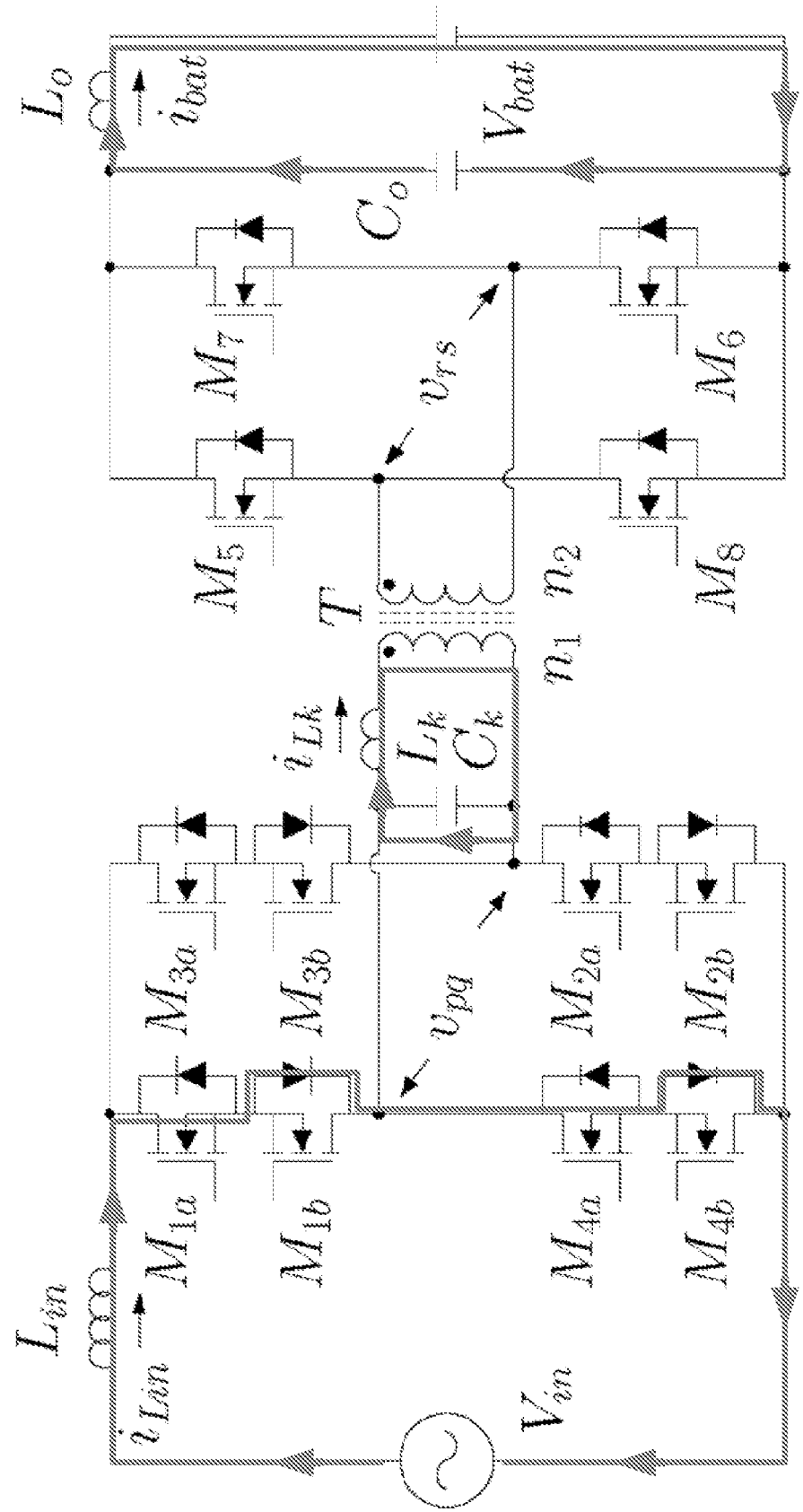
FIG. 3 shows a preferred embodiment of a converter in Mode 2 of operation during G2V mode.

FIG. 3 shows a preferred embodiment of a converter in Mode 2 of G2V mode. In Mode 2, Device $M_{4a}$ is turned on and then $M_{2a}$ is turned off. As a result, ZCS occurs for $M_{2a}$. In this case, the input current ($I_{in}$) freewheels through $M_{1a}$, $M_{4a}$ and diodes of $M_{1b}$ and $M_{4b}$. The capacitor $C_k$ and inductor $L_k$ starts resonating. This resonance causes the leakage current through $L_k$ to reach input current level. As a result, a voltage spike does not appear across the primary device. In other words, the $C_k$ acts as a snubber capacitor. It helps in arresting the voltage overshoot caused due to the current mismatch between the leakage inductor and line inductor. At the end of Mode 2, $M_{3a}$ is turned on. It exhibits ZCS turn-on.

Figure 4:
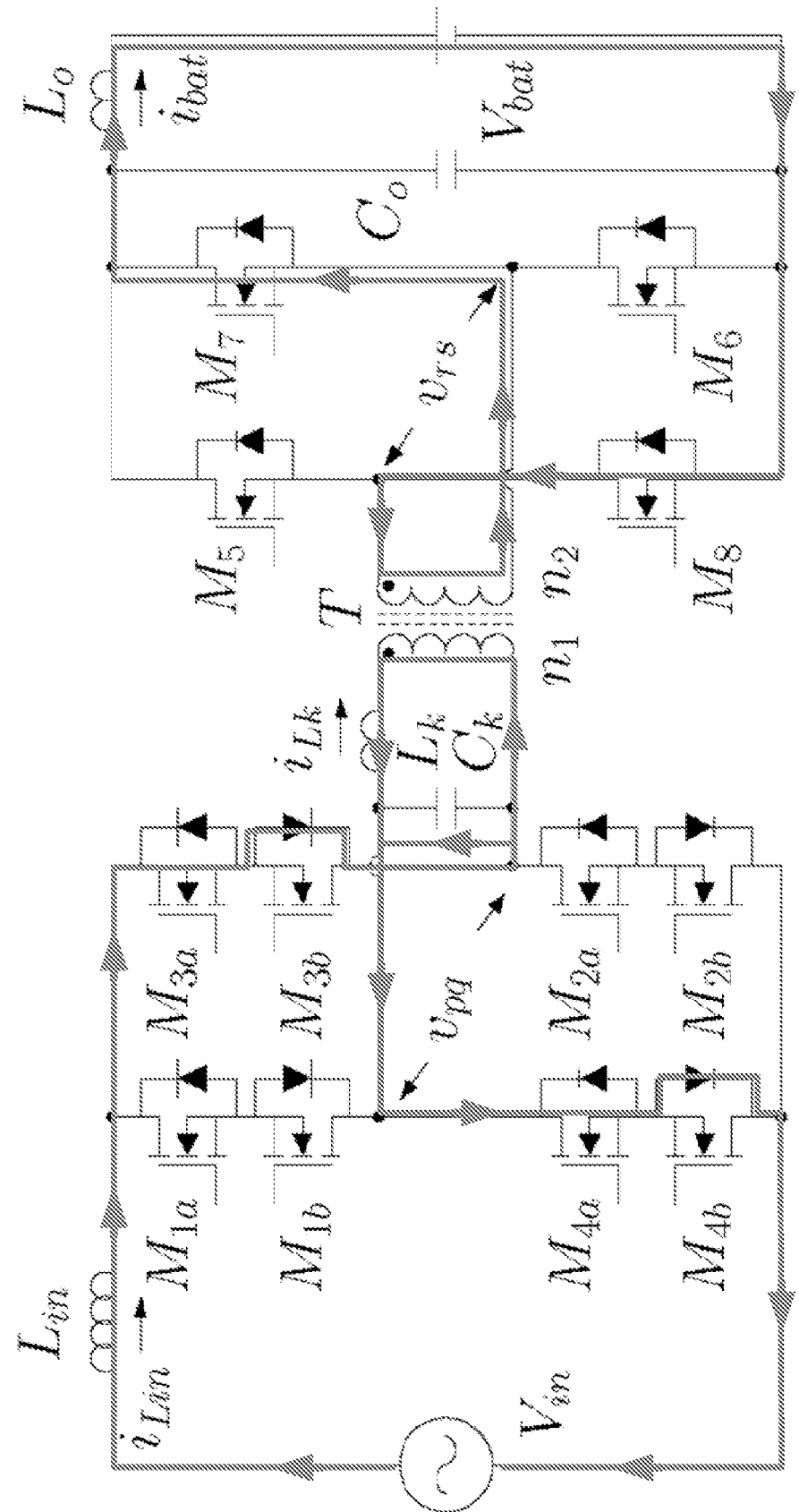
FIG. 4 shows a preferred embodiment of a converter in Mode 3 of operation during G2V mode.

FIG. 4 shows a preferred embodiment of a converter in Mode 3 during G2V mode. In Mode 3, $M_{1a}$ is turned off. The input current flows through $M_{3a}$, $M_{4a}$ and diodes of $M_{3b}$ and $M_{4b}$. The current direction reverses in the leakage inductor $L_k$ and $C_k$. In the secondary side, diodes of $M_7$ and $M_8$ conduct to charge the battery ($V_{bat}$).

Figure 5:
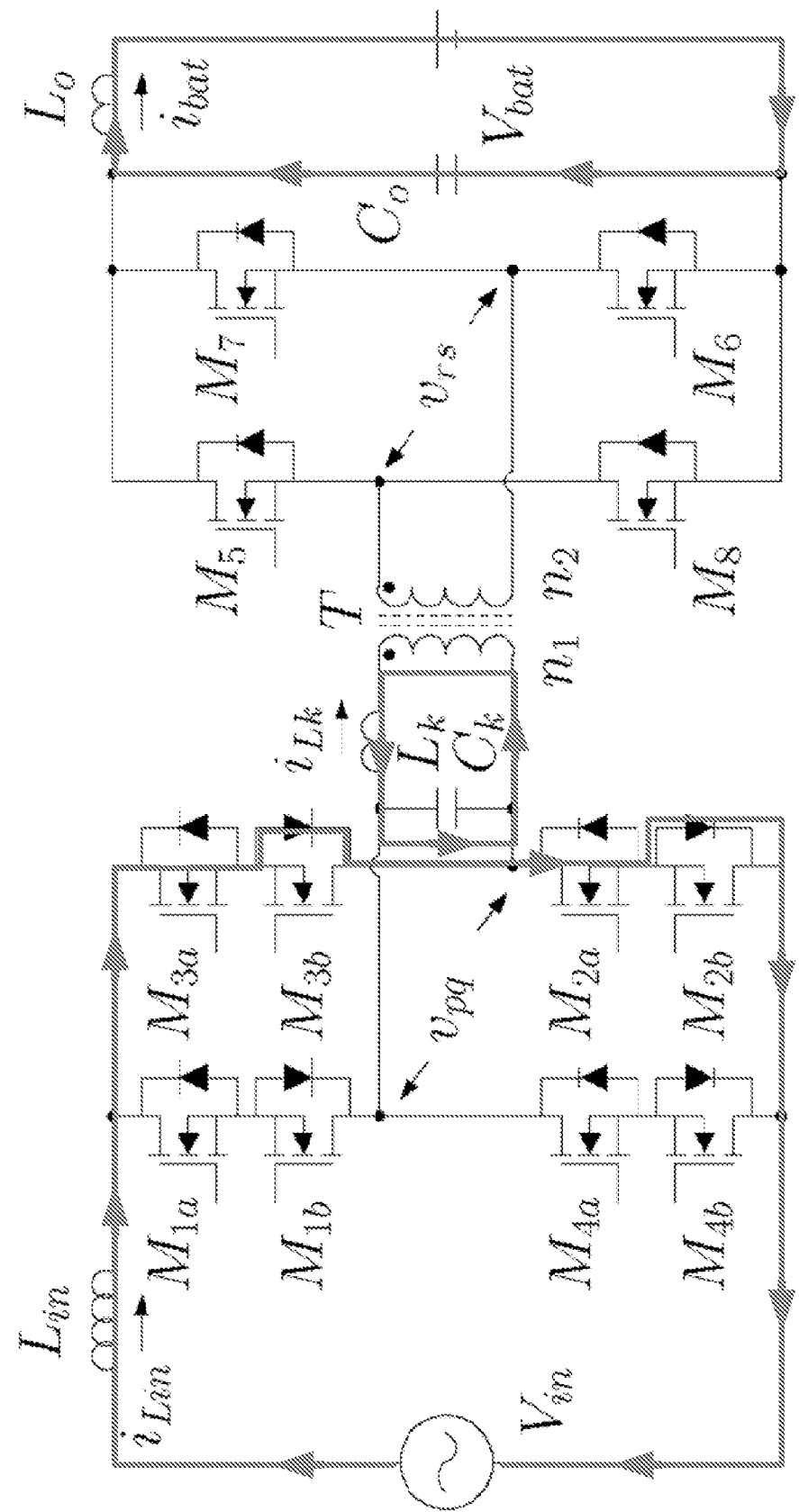
FIG. 5 shows a preferred embodiment of a converter in Mode 4 of operation during G2V mode.

FIG. 5 shows a preferred embodiment of a converter in Mode 4 during G2V mode. In this mode, $M_{2a}$ is turned on and then $M_{4a}$ is turned off. As a result $M_{4a}$ experiences ZCS turn-off. In this case, the input current ($I_{in}$) freewheels through $M_{3a}$ and $M_{2a}$. The capacitor $C_k$ and inductor $L_k$ starts resonating. This resonance causes the leakage current through $L_k$ to reach input current level similar to Mode 2. As a result, a voltage spike does not appear across the primary device. This helps in arresting the voltage overshoot caused due to the current mismatch between the leakage inductor and line inductor. At the end of Mode 3, $M_{1a}$ is turned on. It exhibits ZCS turn-on.

During $V_{in}$>0, $M_{1a}$, $M_{2a}$, $M_{3a}$ and $M_{4a}$ exhibit ZCS. In a similar fashion, Mode 5 to Mode 8 can also be explained. Here $M_{1b}$, $M_{2b}$, $M_{3b}$ and $M_{4b}$ exhibit ZCS. It is important to notice that $C_k$ continues to conduct current even if $V_{bat}$>$V_{in}$. As a result, there is a path for the input current to flow at every switching condition. This phenomena ensures PFC for all loading conditions.

In vehicle to grid (V2G) mode, power is transferred from the battery ($V_{bat}$) to the grid ($V_{in}$). For V2G operation, battery side devices are switched in square wave mode and three level sine triangle pulse-width modulation (PWM) switching is conducted for the grid side devices. For positive input voltage ($V_{in}$>0), the operation can be divided from Mode 9 to Mode 12. Similarly, the operation can be divided from Mode 13 to Mode 16 for $V_{in}$<0. For V2G operation, the resonating capacitor $C_k$ is removed from the circuit through a contactor.

Figure 6:
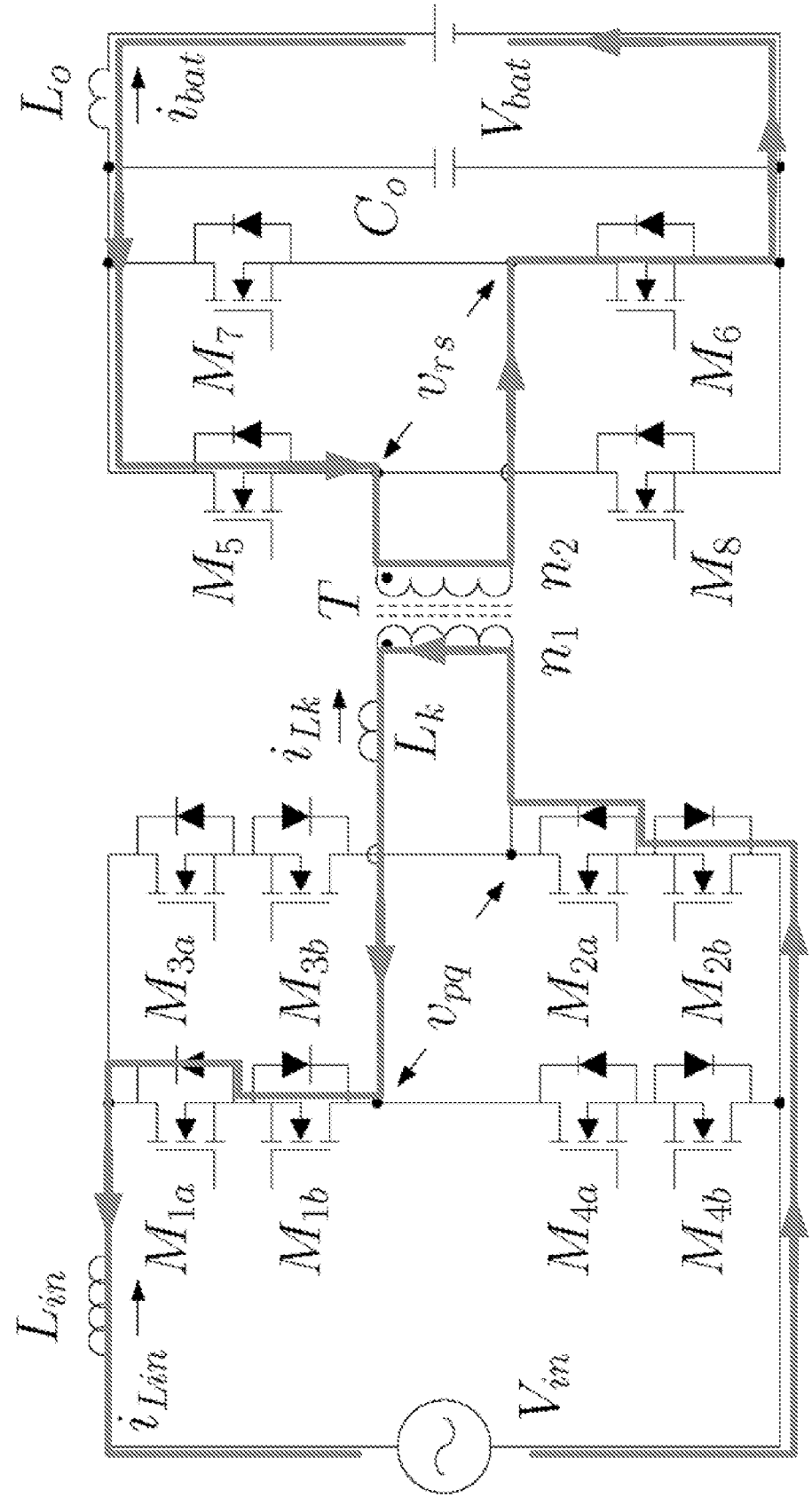
FIG. 6 shows a preferred embodiment of a converter in Mode 9 of operation during vehicle to grid (V2G) mode.

FIG. 6 shows a preferred embodiment of a converter in Mode 9 during V2G mode. In this mode, $M_5$ and $M_6$ in the secondary side are kept on. The grid current flows through $M_{1b}$, $M_{2b}$ and diodes of $M_{1a}$ and $M_{2a}$.

Figure 7:
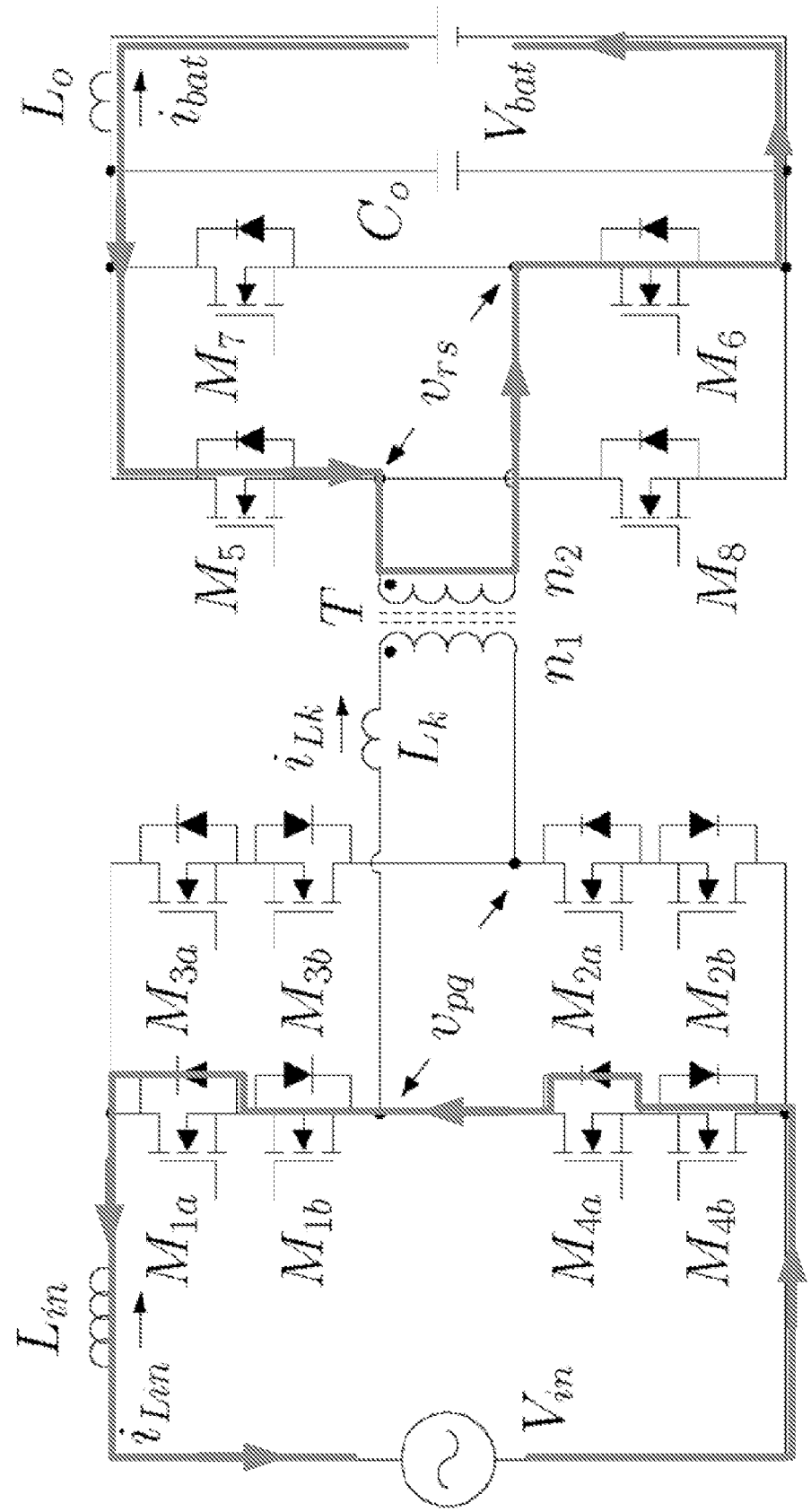
FIG. 7 shows a preferred embodiment of a converter in Mode 10 of operation during V2G mode.

FIG. 7 shows a preferred embodiment of a converter in Mode 10 during V2G mode. In Mode 10, $M_{4b}$ is turned on. As a result, the grid current freewheels through $M_{4b}$, $M_{1b}$ and diodes of $M_{1a}$ and $M_{4a}$. $M_{2b}$ is turned off once the grid current is completely transferred to the freewheeling branch exhibiting ZCS turn-off. At the end of this mode $M_{3b}$ is turned on. $M_{3b}$ experiences ZCS turn on as there is no current through it.

Figure 8:
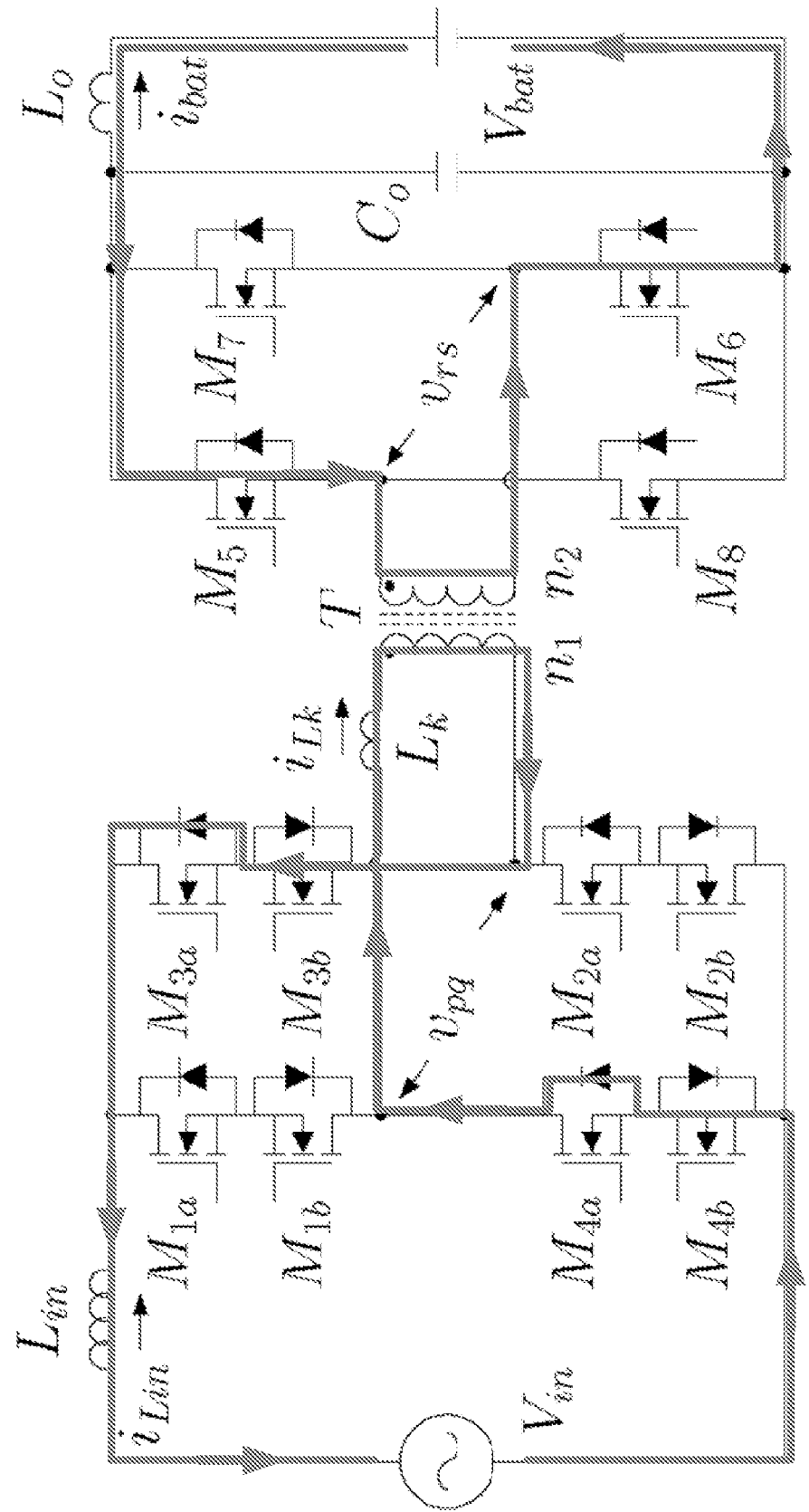
FIG. 8 shows a preferred embodiment of a converter in Mode 11 of operation during V2G mode.

FIG. 8 shows a preferred embodiment of a converter in Mode 11 during V2G mode. In Mode 11, $M_{1b}$ is turned off. As a consequence, grid current flows through $M_{4b}$, $M_{3b}$ and diodes of $M_{4a}$ and $M_{3a}$ respectively. This switching cycle reverses the direction of current flowing through the leakage inductor ($L_k$).

Figure 9:
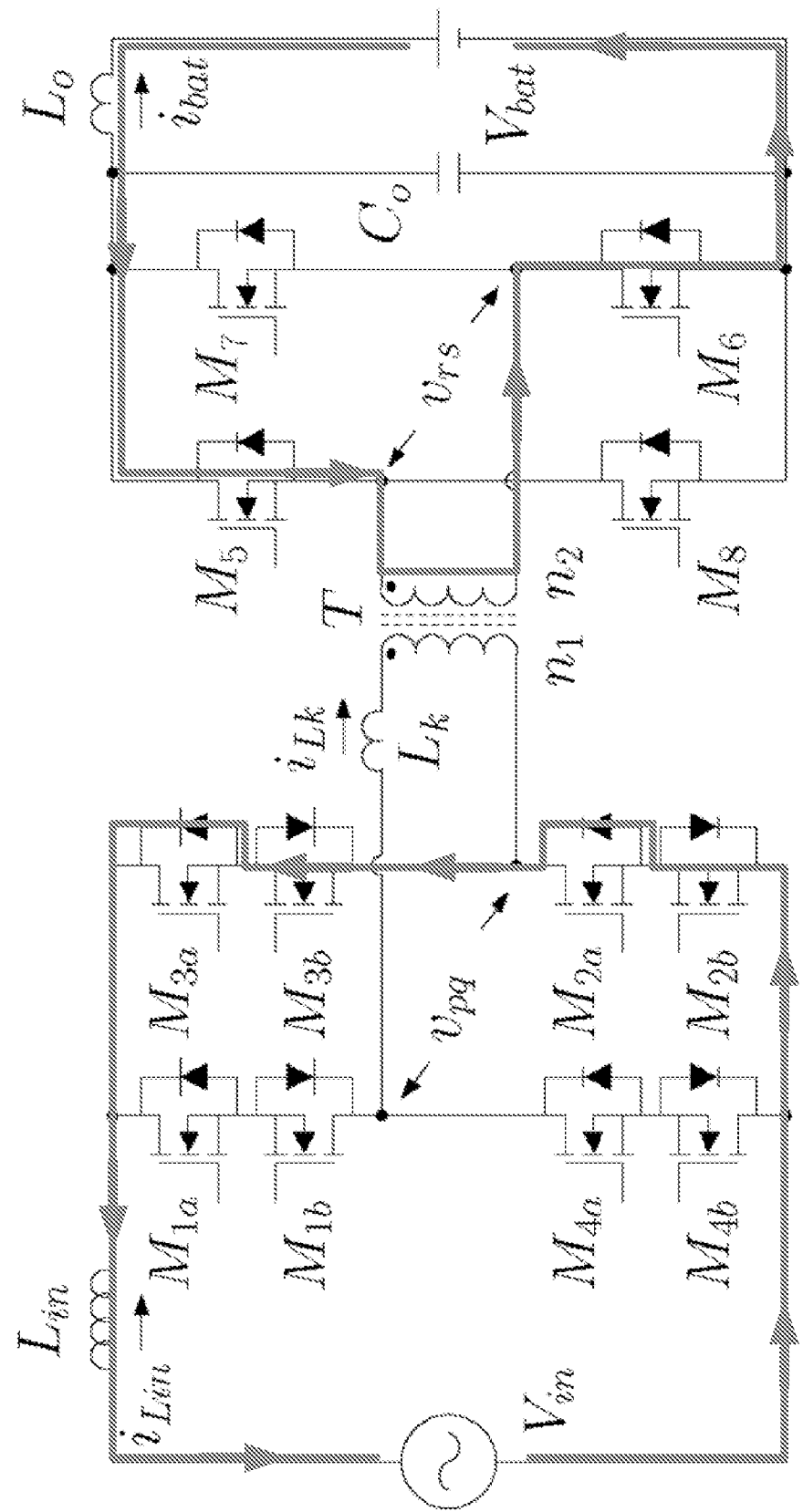
FIG. 9 shows a preferred embodiment of a converter in Mode 12 of operation during V2G mode.

FIG. 9 shows a preferred embodiment of a converter in Mode 12 during V2G mode. At the end of mode 11, $M_{2b}$ is turned on again. The grid current again freewheels through $M_{2b}$, $M_{3b}$ and diodes of $M_{2a}$ and $M_{3a}$. After the transfer of grid current to the freewheeling branch, $M_{4b}$ is turned off. It exhibits ZCS turn-off.

Mode 9 to Mode 12 are continued until $M_5$ and $M_6$ are in the on-state in the secondary side. Once $M_7$ and $M_8$ are turned on, the switching cycles described above are reversed. In a similar fashion, the switching of the devices are carried out for $V_{in}$<0. As described above, all devices on the primary side undergo ZCS.

REFERENCES

The following documents and publications are hereby incorporated by reference.

F. Jauch and J. Biela, "Single-phase single-stage bidirectional isolated ZVS ac-dc converter with PFC," in *Proc. 15th Int. Power Electron. Motion Control Conf.*, 2012, pp. S1d-S5d.

H. S. Athab, D. D. C. Lu, A. Yazdani, and W. Bin, "An efficient singleswitch quasi-active PFC converter with continuous input current and low dc-bus voltage stress," *IEEE Trans. Ind. Electron.*, vol. 61, no. 4, pp. 1735-1749, April 2014.

C. Li, Y. Zhang, and D. Xu, "Soft-switching single stage isolated ac-dc converter for single-phase high power PFC applications," in *Proc. 9th Int. Conf. Power Electron. ECCE Asia*, 2015, pp. 1103-1108.

R. Watson and F. C. Lee, "A soft-switched, full-bridge boost converter employing an active-clamp circuit," in *Proc. 27th Annu. IEEE Power Electron. Spec. Conf.*, 1996, pp. 1948-1954.

C. Qiao and K. M. Smedley, "A topology survey of single-stage power factor corrector with a boost type input-current-shaper," in *Proc. 15th Annu. IEEE Appl. Power Electron. Conf. Expo.*, 2000, pp. 460-467.

M. Pahlevaninezhad, P. Das, P. Jain, A. Bakhshai, and G. Moschopoulos, "A self sustained oscillation controlled three level ac-dc single stage converter," in *Proc. IEEE Appl. Power Electron. Conf. Expo.*, 2012, pp. 1172-1178.

M. Z. Youssef and P. K. Jain, "Analysis and design of a compact single stage ac-dc resonant converter with high power factor," in *Proc. Can. Conf. Elect. Comput. Eng.*, 2007, pp. 702-705.

S. Dusmez, X. Li, and B. Akin, "A fully integrated three-level isolated single-stage PFC converter," *IEEE Trans. Power Electron.*, vol. 30, no. 4, pp. 2050-2062, April 2015.

S. Guo, X. Ni, K. Tan, and A. Q. Huang, "Operation principles of bidirectional isolated ac/dc converter with natural clamping soft switching scheme," in *Proc. 40th Annu. Conf. IEEE Ind. Electron. Soc.*, 2014, pp. 4866-4872.

H. S. Ribeiro and B. Vieira Borges, "Solving technical problems on the full-bridge single-stage PFCs," *IEEE Trans. Ind. Electron.*, vol. 61, no. 5, pp. 2264-2277, May 2014.

H. Pinheiro, P. Jain, and G. E. Z. Joos, "Self-oscillating resonant ac/dc converter topology for input power-factor correction," *IEEE Trans. Ind. Electron.*, vol. 46, no. 4, pp. 692-702, August 1999.

P. K. Jain, J. E. R. Espinoza, and N. Ismail, "A single-stage zero-voltage zero-current-switched full-bridge dc power supply with extended load power range," *IEEE Trans. Ind. Electron.*, vol. 46, no. 2, pp. 261-270, April 1999.

J. Chen, R. Chen, and T. Liang, "Study and implementation of a single-stage current-fed boost PFC converter with ZCS for high voltage applications," *IEEE Trans. Power Electron.*, vol. 23, no. 1, pp. 379-386, January 2008.

B. Singh, B. N. Singh, A. Chandra, K. Al-Haddad, A. Pandey, and D. P. Kothari, "A review of single-phase improved power quality ac-dc converters," *IEEE Trans. Ind. Electron.*, vol. 50, no. 5, pp. 962-981, October 2003.

D. Gautam, F. Musavi, M. Edington, W. Eberle, and W. G. Dunford, "An automotive on-board 3.3 kW battery charger for PHEV application," in *Proc. 2011 IEEE Veh. Power Propulsion Conf.*, 2011, pp. 1-6.

N. Weise and L. Doiron, "DQ current control of a bidirectional, isolated single-stage ac-dc converter," in *Proc. 29th Annu. IEEE Appl. Power Electron. Conf. Expo.*, 2014, pp. 1888-1893.

G. Xu, D. Sha, and X. Liao, "Input-series and output-parallel connected single stage buck type modular ac-dc converters with high-frequency isolation," *IET Power Electron.*, vol. 8, pp. 1295-1304, 2015.

W. Zhu, K. Zhou, M. Cheng, and F. Peng, "A high-frequency-link single phase PWM rectifier," *IEEE Trans. Ind. Electron.*, vol. 62, no. 1, pp. 289-298, January 2015.

M. S. Agamy and P. K. Jain, "A three-level resonant single-stage power factor correction converter: Analysis, design, and implementation," *IEEE Trans. Ind. Electron.*, vol. 56, no. 6, pp. 2095-2107, June 2009.

J. Everts, F. Krismer, J. Van den Keybus, J. Driesen, and J. W. Kolar, "Optimal ZVS modulation of single-phase single-stage bidirectional DAB ac-dc converters," *IEEE Trans. Power Electron.*, vol. 29, no. 8, pp. 3954-3970, August 2014.

What is claimed is:

1. A method for charging an electric vehicle (EV) battery in grid to vehicle mode, comprising:

transferring input current from an input source to a power converter having bidirectional power flow capabilities and inherent power factor correction (PFC) control, wherein the power converter comprises a high frequency transformer comprising a primary AC side, a secondary side, and a resonating circuit, wherein the primary AC side of the high frequency transformer comprises a current-fed full bridge matrix converter, wherein the current-fed full bridge matrix converter comprises eight silicon carbide (SiC) metal-oxide-semiconductor field-effect transistors (MOSFETs) positioned in four pairs, wherein a first pair of SiC MOSFETS consists of a first A SiC MOSFET and a first B SiC MOSFET, wherein a second pair of SiC MOSFETs consists of a second A SiC MOSFET and a second B SiC MOSFET, wherein a third pair of SiC MOSFETs consists of a third A SiC MOSFET and a third B SiC MOSFET, and wherein a fourth pair of SiC MOSFETs consists of a fourth A SiC MOSFET and a fourth B SiC MOSFET, wherein the secondary side of the high frequency transformer comprises a full bridge matrix converter, wherein the full bridge matrix converter comprises four SiC MOSFETs, wherein the four SiC MOSFETs consist of a fifth SiC MOSFET, a sixth SiC MOSFET, a seventh SiC MOSFET, and an eighth SiC MOSFET, and wherein the resonating circuit comprises a leakage inductor of the high frequency transformer and a capacitor;

performing active switching in the primary AC side of the of the high frequency transformer by turning on the first A SiC MOSFET and the second A SiC MOSFET and turning off or keeping off the first B SiC MOSFET and the second B SiC MOSFET, whereby the first B SiC MOSFET and the second B SiC MOSFET acts as diodes, and whereby the input current flows from the input source to the leakage inductor and the capacitor through the first A SiC MOSFET and the second A SiC MOSFET and the diodes of the first B SiC MOSFET and the second B SiC MOSFET; and charging the battery by conducting current through the fifth SiC MOSFET and the sixth SiC MOSFET, which act as diodes.

2. The method of claim 1, further comprising the steps of:

performing active switching in the primary AC side of the high frequency transformer by turning on the fourth A SiC MOSFET and turning off the second A SiC MOSFET, whereby the first B SiC MOSFET and the fourth B SiC MOSFET acts as diodes, whereby the input current flows through the first A SiC MOSFET and the fourth A SiC MOSFET and the diodes of the first B SiC MOSFET and the fourth B SiC MOSFET, and whereby the capacitor resonates to cause leakage current through the leakage inductor to reach input current level; and performing active switching in the primary AC side of the high frequency transformer by turning on the third A SiC MOSFET, whereby the third A SiC MOSFET exhibits zero current switching turn-on.

3. The method of claim 2, further comprising the steps of:

performing active switching in the primary AC side of the of the high frequency transformer by turning off the first A SiC MOSFET, whereby the third B SiC MOSFET and the fourth B SiC MOSFET act as diodes, and whereby the input current flows to the leakage inductor and the capacitor through the third A SiC MOSFET and the fourth A SiC MOSFET and the diodes of the third B SiC MOSFET and the fourth B SiC MOSFET; and charging the battery by conducting current through the seventh SiC MOSFET and the eighth SiC MOSFET, which act as diodes.

4. The method of claim 3, further comprising the steps of:

performing active switching in the primary AC side of the high frequency transformer by turning on the second A SiC MOSFET and turning off the fourth A SiC MOSFET, whereby the fourth A SiC MOSFET exhibits zero current switching turn-off, whereby the third B SiC MOSFET and the second B SiC MOSFET act as diodes, whereby the input current flows through the third A SiC MOSFET and the second A SiC MOSFET and the diodes of the third B SiC MOSFET and the second B SiC MOSFET, and whereby the capacitor resonates to cause leakage current through the leakage inductor to reach input current level; and performing active switching in the primary AC side of the high frequency transformer by turning on the first A SiC MOSFET, whereby the first A SiC MOSFET exhibits zero current switching turn-on.

5. A method for operating an electric vehicle (EV) battery in vehicle to grid mode, comprising:

transferring power from the battery to the secondary side of a power converter having bidirectional power flow capabilities and inherent power factor correction (PFC) control, wherein the power converter comprises a high frequency transformer comprising a primary AC side, a secondary side, and a resonating circuit, wherein the primary AC side of the high frequency transformer comprises a current-fed full bridge matrix converter, wherein the current-fed full bridge matrix converter comprises eight silicon carbide (SiC) metal-oxide-semiconductor field-effect transistors (MOSFETs) positioned in four pairs, wherein a first pair of SiC MOSFETS consists of a first A SiC MOSFET and a first B SiC MOSFET, wherein a second pair of SiC MOSFETs consists of a second A SiC MOSFET and a second B SiC MOSFET, wherein a third pair of SiC MOSFETs consists of a third A SiC MOSFET and a third B SiC MOSFET, and wherein a fourth pair of SiC MOSFETs consists of a fourth A SiC MOSFET and a fourth B SiC MOSFET, wherein the secondary side of the high frequency transformer comprises a full bridge matrix converter, wherein the full bridge matrix converter comprises four SiC MOSFETs, wherein the four SiC MOSFETs consist of a fifth SiC MOSFET, a sixth SiC MOSFET, a seventh SiC MOSFET, and an eighth SiC MOSFET, and wherein the resonating circuit comprises a leakage inductor of the high frequency transformer and a capacitor;

performing active switching in the secondary side of the high frequency transformer in square wave mode by turning on or keeping on the fifth SiC MOSFET and the sixth SiC MOSFET; and performing active switching in the primary AC side of the of the high frequency transformer through three level sine triangle pulse-width modulation (PWM) switching by turning on the first B SiC MOSFET and the second B SiC MOSFET and turning off or keeping off the first A SiC MOSFET and the second A SiC MOSFET, whereby the first A SiC MOSFET and the second A SiC MOSFET acts as diodes, and whereby grid current flows through the first B SiC MOSFET and the second B SiC MOSFET and the diodes of the first A SiC MOSFET and the second A SiC MOSFET.

6. The method of claim 5, further comprising the steps of:

performing active switching in the primary AC side of the high frequency transformer by turning on the fourth B SiC MOSFET, whereby the first A SiC MOSFET and the fourth A SiC MOSFET acts as diodes, whereby the grid current flows through the first B SiC MOSFET and the fourth B SiC MOSFET and diodes of the first A SiC MOSFET and the fourth A SiC MOSFET;

performing active switching in the primary AC side of the high frequency transformer by turning off the second B SiC MOSFET after the grid current is completely transferred, whereby the second B SiC MOSFET exhibits zero current switching turn-off; and performing active switching in the primary AC side of the high frequency transformer by turning on the third B SiC MOSFET, whereby the third B SiC MOSFET exhibits zero current switching turn-on.

7. The method of claim 6, further comprising the steps of:

performing active switching in the primary AC side of the of the high frequency transformer by turning off the first B SiC MOSFET, whereby the grid current flows through the fourth B SiC MOSFET and the third B SiC MOSFET and diodes of the fourth A SiC MOSFET and the third A SiC MOSFET, whereby the direction of current flowing through the leakage inductor is reversed.

8. The method of claim 7, further comprising the steps of:

performing active switching in the primary AC side of the high frequency transformer by turning on the second B SiC MOSFET, whereby the grid current flows through the second B SiC MOSFET and the third B SiC MOSFET and diodes of the second A SiC MOSFET and the third A SiC MOSFET; and performing active switching in the primary AC side of the high frequency transformer by turning off the fourth B SiC MOSFET after the grid current is completely transferred, whereby the fourth B SiC MOSFET exhibits zero current switching turn-off.

* * * * *

UNITED STATES PATENT AND TRADEMARK OFFICE
CERTIFICATE OF CORRECTION

| | |
|---|---|
| PATENT NO. | : 11,323,038 B2 |
| APPLICATION NO. | : 16/638620 |
| DATED | : May 3, 2022 |
| INVENTOR(S) | : Kaushik Rajashekara et al. |

It is certified that error appears in the above-identified patent and that said Letters Patent is hereby corrected as shown below:

In the Specification

In Column 4, Line 11, delete "$M_{4b}b$," and insert -- $M_{4b}$, --, therefor.

Signed and Sealed this
Fifteenth Day of November, 2022

Katherine Kelly Vidal
Director of the United States Patent and Trademark Office